United States Patent [19]

Coleman et al.

[11] 3,919,618
[45] Nov. 11, 1975

[54] HYSTERESIS BATTERY CHARGER

[75] Inventors: Charles E. Coleman, Denver; Ronald O. Hammel, Englewood, both of Colo.

[73] Assignee: The Gates Rubber Company, Denver, Colo.

[22] Filed: June 10, 1974

[21] Appl. No.: 477,719

[52] U.S. Cl. ............... 320/39; 320/DIG. 1; 320/23
[51] Int. Cl.$^2$ ............................................. H02J 7/10
[58] Field of Search ..... 320/39, 40, DIG. 1, DIG. 2, 320/22–24

[56] References Cited
UNITED STATES PATENTS

| | | | |
|---|---|---|---|
| 3,553,561 | 1/1971 | Lesher | 320/39 X |
| 3,678,363 | 7/1972 | Ringle | 320/39 X |
| 3,735,233 | 5/1973 | Ringle | 320/39 X |

*Primary Examiner*—J. D. Miller
*Assistant Examiner*—Robert J. Hickey
*Attorney, Agent, or Firm*—Curtis H. Castleman, Jr.; Raymond Fink; H. W. Oberg, Jr.

[57] ABSTRACT

A charging network is described having a series pass element for delivering charging current to a battery, means for sensing the state of charge of the battery, and control circuitry for regulating battery charging. A non-linear voltage reference element operatively associated with the control circuitry enables the battery to be charged to a predetermined relatively high voltage cut-off level at which time positive latch-out of charging occurs. Charging is reinitiated only after the battery voltage level has dropped to a predetermined level below the initial charge cut-off level. This hysteresis effect (loop width) may be selectively controlled.

22 Claims, 9 Drawing Figures

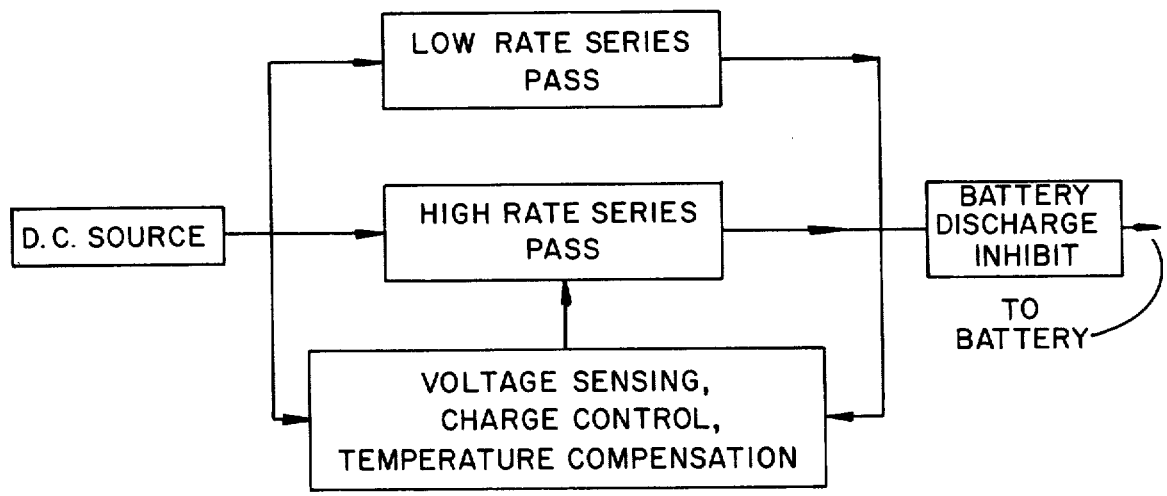
FIG. I
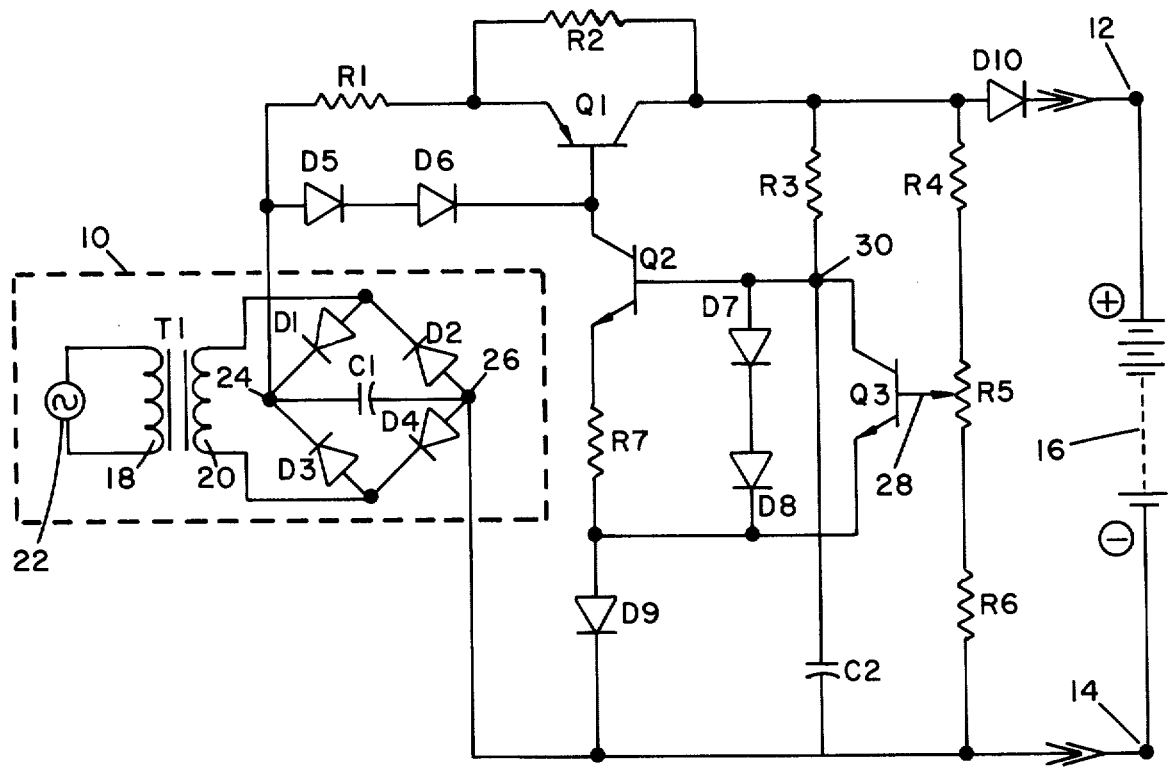
FIG. 2

3,919,618

HYSTERESIS BATTERY CHARGER

BACKGROUND OF THE INVENTION

This invention relates generally to current supply apparatus and more particularly to the precise automatic charging of electrochemical generators and the like.

There are known types of battery charging networks which will deliver charging current to a battery initially at a relatively high rate, sense the charge level of the battery and use voltage feedback control circuitry to automatically cut-off or reduce the charging output level. The automatic nature of these chargers permits the attendant to leave the battery connected to the charging network normally without fear of damage to the cell even for prolonged periods. However, many of these charging networks maintain the battery at a constant voltage level with the result that the cell may eventually be damaged for lack of positive charge latch-out. In this respect, oftentimes high rate, possibly damaging charging pulses are admitted to the battery prior to cut-off, or thermal runaway may ensue.

Examples of known charging devices characterized by automatic charging control include U.S. Pat. Nos. 3,179,871 (Bagno), 3,517,295 (Lapuyade) and 3,585,482 (Zelina).

SUMMARY OF THE INVENTION

The charger of the present invention couples the advantages of automatic charging control with a low cost, versatile unit particularly suited for charging secondary cells, such as sealed lead-acid cells with such desirable features as short circuit protection of the output and automatic temperature compensation. The charging network provides popsitive latch-out at a predetermined voltage cut-off point, and precludes admission to the battery of possibly damaging pulses by lowering the voltage level at which the charger reinitiates the high charging rate to a safe charge acceptance level. The width of the hysteresis loop, that is the difference between the high rate charge cut-off voltage and the associated low voltage cut-in value is controllable by selection of network component values, permitting float or cycling type service, for instance. Known charging networks having similar characteristics as those provided by the network of the subject invention have often utilized much more costly and complicated circuitry.

Briefly described, the charging network includes a source of unidirectional charging current, a series pass element such as a transistor switch, means connected across the battery for producing a voltage proportional to the voltage exhibited by the battery, and means for comparing the proportional voltage to a voltage reference element which exhibits a non-linear voltage drop thereacross depending upon the magnitude of current being conducted by the non-linear element. A control signal representative of the difference between the proportional voltage and the voltage exhibited by the voltage reference element is applied through circuitry to either render the series pass element conducting or substantially non-conducting; the voltage reference element exhibits a relatively higher voltage thereacross when the series pass element is in its conducting state and a relatively lower voltage thereacross when the series pass element is in its substantially non-conducting state. When the proportional voltage is at or below a first predetermined value the battery charging circuitry delivers high rate charging current to the battery, and ceases to deliver high rate charging current to the battery when the proportional voltage reaches or exceeds a second predetermined value which is greater (by a pre-selected amount) than the first predetermined value. High rate charging through the series pass element does not again commence until the battery voltage has dropped approximately down to or below the first predetermined value, hence the hysteresis loop effect, the width of which may be controlled by proper selection of circuitry components.

In a further aspect, a first shunt path is connected from the control terminal of the series pass element to the negative terminal of the battery through a switching element and through the aforementioned voltage reference element. A second shunt path is connected from the high rate series charging path preferably through a switching element and through the voltage reference element to the negative terminal of the battery. Means for sensing the state of charge of the battery produces a control signal which enables either the first or second shunt path to be in a conducting state, the other path being in a substantially non-conducting state. When the first shunt path is conducting the series pass element is enabled, and when the second shunt path is conducting the series pass element is in a substantially non-conduction mode. The disparity in currents which flow through each of the respective shunt paths results in a different voltage being exhibited by the voltage reference element due to its non-linearity, which in turn produces the desirable hysteresis effect.

BRIEF DESCRIPTION OF THE DRAWINGS

Reference will be made to the accompanying drawings showing certain preferred embodiments of the invention, in which like numerals designate like parts in the several figures, and wherein:

FIG. 1 is a block diagram illustrating a preferred arrangement of the invention;

FIG. 2 is a schematic circuit diagram of a battery-charging system in accordance with one embodiment of the invention;

PREFERRED EMBODIMENTS OF THE INVENTION

Figure 3:
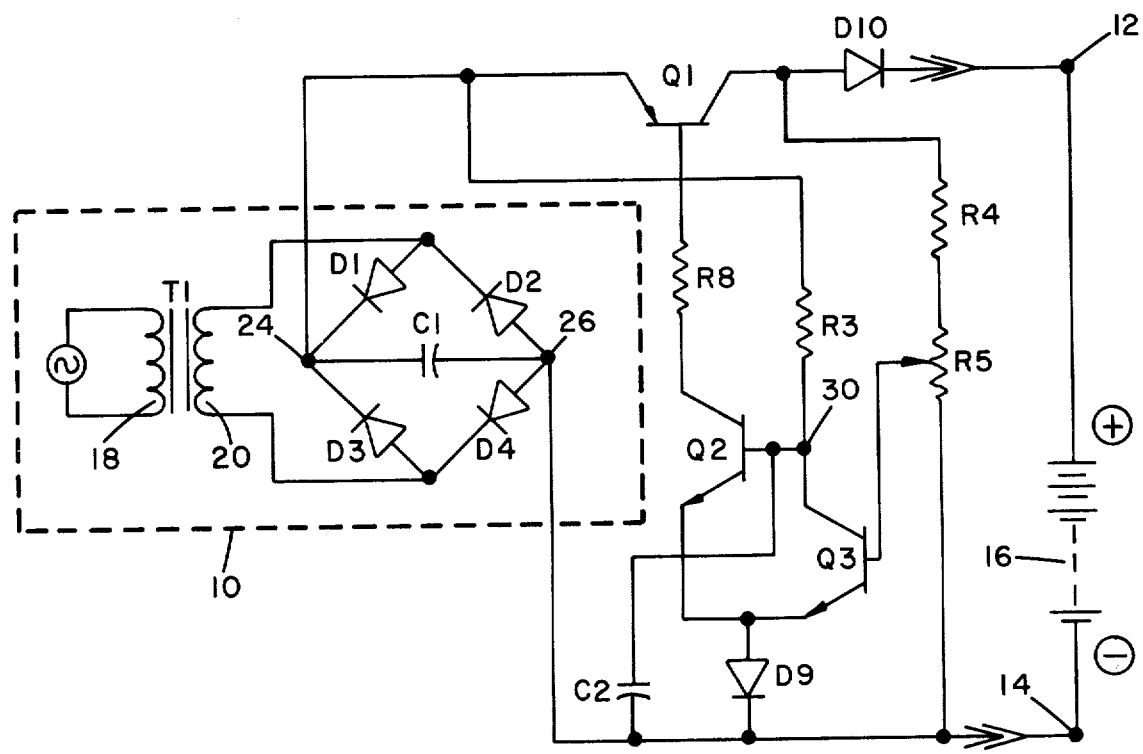
FIGS. 3, 4 and 5 depict network modifications of the circuit diagram of FIG. 2.

Referring to FIG. 1, a DC source which may be a battery or an AC to DC converter, for instance, provides a DC voltage suitable for use by the charger. Charging current is delivered to the battery through a high rate series pass element which may include a current limit. A much reduced current is provided through a low rate series pass which may provide a trickle or float charge, for instance. The state of charge of the battery is sensed and charge control is provided to adjust the charging rate as desired. The control will also preferably adjust charging characteristics to compensate for temperature variations. An element is also provided in series with the battery which blocks or inhibits discharge of the battery when the charger is not energized.

Referring to FIG. 2, there is shown an implementation of a battery charging circuit in accordance with the present invention which generally includes a source of unidirectional current 10, output terminals 12, 14 adapted to be connected to a battery 16 consisting of one or more cells to be charged, and an electronic switching circuit connected therebetween for controlling charging current to the battery.

The direct current source 10 includes a transformer T1 having a primary winding 18 energized from a suitable source 22 such as the customary 115 volt AC 60 Hz supply. The secondary winding 20 of the transformer is connected to a customary full wave rectifier bridge circuit including diodes D1, D2, D3 and D4 with a capacitor C1 connected across terminals 24, 26 for reducing the output ripple of the bridge.

The rectifier bridge terminal 26 is connected to the negative terminal 14 of the battery, and terminal 24 is connected to the positive terminal 12 of the battery through a network including current limit resistor R1, high series pass PNP power transistor Q1 through its emitter/collector path, trickle resistor R2 shunting Q1, and diode D10 which prevents discharge of the battery through the network if the charger is not energized.

A resistive divider network consisting of R4, R5 and R6 is connected across the battery and senses its state of charge or voltage level. An adjustable tap 28 on potentiometer R5 is connected to the base of variable conducting means NPN transistor Q3 whose emitter is connected to the negative terminal 14 of the battery through voltage reference element diode D9. The collector of Q3 is connected to junction 30 at the control terminal or base of variable conducting means NPN transistor Q2. Resistor R3 is connected from junction 30 to the high rate charging path between the DC source and battery.

Shunting NPN transistor Q2 has its collector connected to the base of series pass element Q1 and its emitter connected to voltage reference means D9 through resistor R7.

The combination of diodes D5 and D6 shunted across resistor R1 and the emitter/base junction of Q1 provide the high rate series pass element with current limit. Similarly, diodes D7 and D8 in conjunction with R7 and the base/emitter junction of Q2 form an additional constant current limit source for the first shunt path.

Capacitor C2 connected from junction 30 to the negative terminal of the battery 14 serves to prevent oscillation during operation of the circuit.

Resistor R2 with resistor R1 form a path for current in the low rate charge mode as a trickle charge or float maintenance charge.

Figure 9:
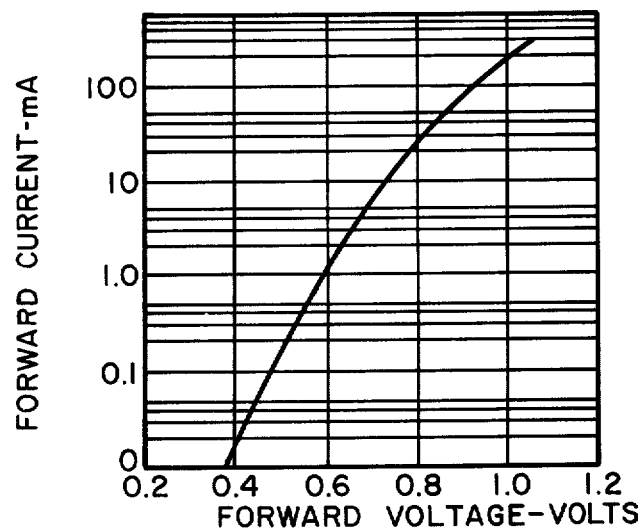
FIG. 9 is a truncated typical characteristic curve for the forward voltage versus forward current characteristic of the voltage reference element of the invention.

The operation of the circuitry of FIG. 2 may be described as follows. Assuming the initial condition of the battery is fully or nearly fully charged, the charger will be in its low rate charging mode. The resistive divider network consisting of R4, R5 and R6 will sense a voltage proportional to the voltage exhibited by the battery sufficient to render the base of Q3 sufficiently positive to place Q3 in or near saturation, i.e., the voltage at the divider determined by the tapping point 28 will be sufficiently greater than the reference voltage exhibited across diode D9 to maintain Q3 in or near saturation. The voltage reference element in this regard exhibits a non-linear voltage drop across its terminals depending upon the magnitude of current being conducted by the element. Clearly other types of non-linear devices are usable as the voltage reference element. A typical forward voltage versus forward current characteristic curve for diode D9 is shown in FIG. 9 plotted on semi-log scaled coordinates. It is clear from the forward voltage characteristic in FIG. 9 that the forward voltage exhibited by the reference element will vary within a few tenths of a volt corresponding to a large change in current carried by the device.

When the charger is in its low rate mode and the potential at the tapping point 28 is sufficient to place Q3 in saturation, a shunt current path will be provided through D9 and essentially supplied by resistors R1, R2 and R3. The impedances of the resistors, and particularly R3, are so chosen that the current through D9 will be relatively low and hence the forward voltage drop across D9 will also be low. With Q3 in saturation the potential at junction 30 will be insufficient to forward bias the base/emitter junction of Q2. With transistor Q2 in or near cut-off, the base of the high rate pass transistor Q1 will be insufficiently negative with respect to the emitter to render that transistor conductive, so that only a trickle rate of charge will flow to the battery through R1 and bypass resistor R2.

As the voltage exhibited by the battery is reduced (such as by intermittent discharge or self-discharge), the corresponding voltage at the tapping point 28 of the divider network will also be reduced. When this voltage at the tapping point is at or below a predetermined value, the voltage at the base of Q3 will no longer be high enough to hold Q3 in saturation, so that the bias at the base of Q2 is sufficient to render Q2 conductive. With Q2 conductive, a shunt path from the base of Q1 through the collector/emitter path of Q2, R7 and D9 is provided. The component values in this shunt current path and particularly the value of R7, will be so chosen that the current through D9 will be high (relative to the current through D9 when Q2 is non-conductive) and controlled by the constant current source consisting of Q2, R7, D7 and D8. The forward voltage drop across diode D9 will therefore be increased due to the increased current supplied by the current source Q2 (again refer to FIG. 9). With Q2 rendered conductive, the base of Q1 is rendered sufficiently negative with respect to its emitter to place Q1 in conduction and the charger is in its high rate charging mode. With the increased current flow and increase in voltage drop across D9, the reference voltage is raised sufficiently to insure that transistor Q3 is in cut-off.

The charger will continue in its high rate mode until the voltage at the base of Q3 is increased sufficiently (due to the increasing voltage of the battery) to saturate Q3 and turn off Q2, which in turn controls the switch-like conduction state of Q1. Because of the higher voltage drop across D9 in the high rate charging mode, the charger will cause the voltage of the battery to be elevated to a predetermined value which is greater than the voltage corresponding to the point at which the high rate charge was initiated. Thus, the charger is able to sense the battery voltage and supply the necessary charge to maintain the battery at a high state of charge. The charger will continue to remain in the low rate charging mode until the battery voltage drops below a predetermined value, indicating a low state of charge, at which time the charger will again enable the high rate series pass element Q1. This hysteresis effect of the charger is illustrated in the graphs of FIGS. 6, 7 and 8, respectively, illustrating float, cycling type service and the hysteresis loop generally.

Figure 6:
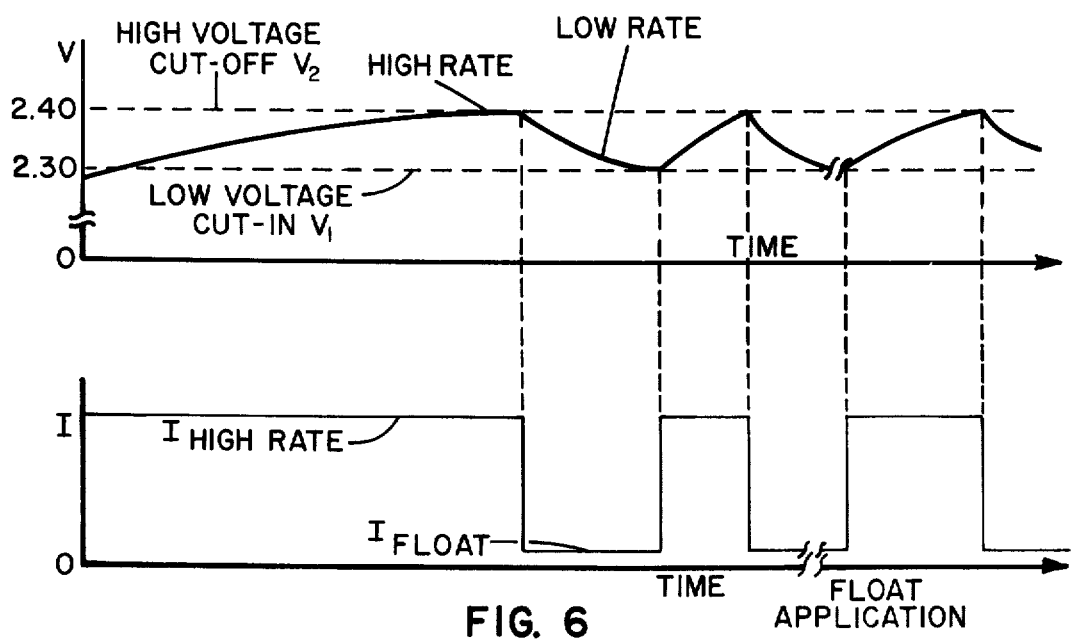
FIG. 6 depicts charging curves of the invention for float application.

Referring to FIG. 6, in a float application it is generally recognized that the life of the battery will be extended by charging the battery at a relatively low voltage value. In this particular illustration a lead-acid battery is charged in the high rate to 2.4 volts per cell. It is also recognized that the low or trickle charge rate is kept quite low such as just exceeding the self-discharge rate of the cell to maintain the battery in a high state of charge without excessively overcharging the cell. The hysteresis feature of the charger is evidenced by the disparity between the relatively lower voltage of the cell at which the high series pass element Q1 is enabled (2.3 volts for reinitiation, below 2.3 volts for start-up) and the relatively higher voltage at which cut-off of high rate charging is effected (2.4 volts).

Figure 7:
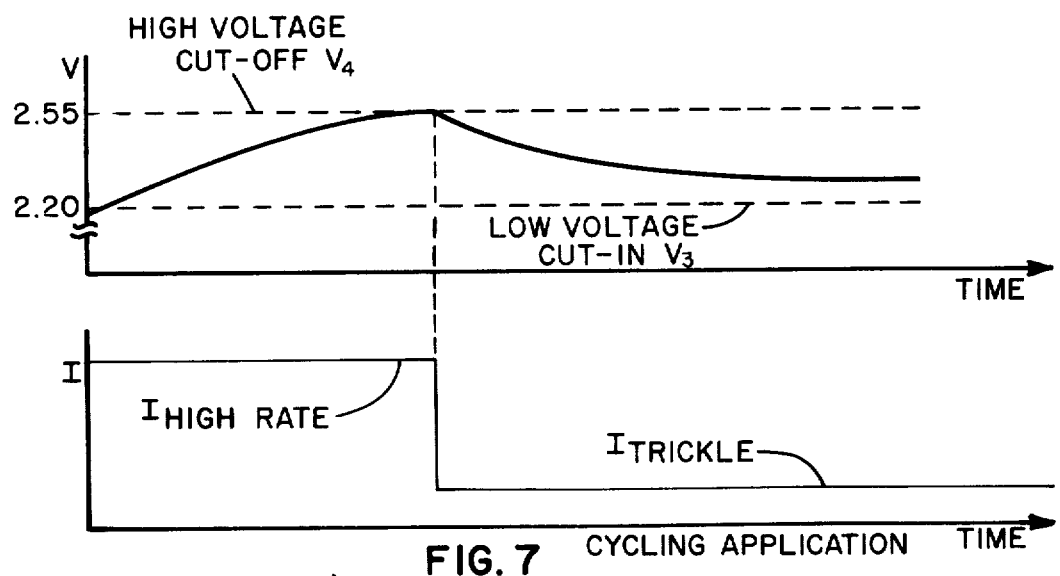
FIG. 7 depicts charging curves for a typical cycling application of the invention.

A similar situation is shown in FIG. 7 pertaining to cycling-type operation. In this situation, however, the difference between the high voltage cut-off and the low voltage cut-in is generally quite a bit greater than the corresponding difference for float application, i.e. the width of the hysteresis loop is widened. In this instance, the trickle current rate may be about 10 times the rate employed in the float application situation. Note that for the cycling application in particular, the difference between the high voltage cut-off value and the low cut-in value produces a positive latch-out of high rate charging so as to prevent a a reinitiation of high rate charging (with possible damaging consequences to the cell) until the open circuit voltage has dropped to a safe level.

Figure 8:
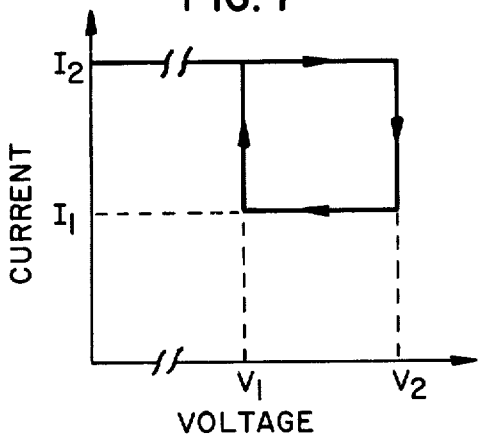
FIG. 8 shows a typical hysteresis loop graph of charging current versus voltage.

In general, the graph of charging current versus charging voltage produces a hysteresis loop as shown in FIG. 8. The high rate charge current, $I_2$, is supplied at essentially a constant value until the high voltage cut-off value, $V_2$, is reached. This situation corresponds to the case where the shunt path through Q2 of FIG. 2 supplies a relatively high current through diode D9 and hence its voltage is at a high level. When the high voltage level $V_2$ is reached by the cell, Q3 begins to conduct, goes into saturation, whereby Q2 is cut off. The shunt path through R3, Q3 and D9 significantly reduces the current through D9, thereby lowering the reference voltage thereacross. Current through the resistors R1 and R2 at the low rate, $I_1$, continues until the battery voltage has been reduced to its low voltage cut-in value, $V_1$. At this point, transistor Q1 is switched on and the high rate current is again supplied to the battery. As the foregoing sequence of conditions recurs, the hysteresis loop will be repeated.

An important feature of the invention is the ability to control the width of the hysteresis loop (i.e. the difference between $V_1$ and $V_2$). The width may be narrowed to supply a nearly constant voltage output or it may be widened to allow charging only when the battery voltage is low. The loop width is controlled by the current through the voltage reference element, diode D9. By increasing the current through D9 when in the low rate charging mode, or by reducing the current through D9 when in the high rate mode, the loop is narrowed; the current may be increased through D9 when in the low rate by lowering the impedance value of R3, and current may be reduced through D9 when in the high rate by raising the impedance value of R7, respectively.

Conversely, the loop width may be broadened by reducing the current through D9 when in the low rate, and increasing the current through D9 when in the high rate. It will also be noted that the loop width is easily varied over a wide range by the magnifying effect provided by the voltage divider, interposed between the voltage reference element and the battery being charged.

In its preferred form, the charging network of the subject invention incorporates temperature compensation into the sensing and control network. For example, preferably the base emitter junction of Q3 and/or the P-N junction of diode D9 have negative temperature coefficients. Therefore, the voltage required to saturate Q3 is changed with temperature, viz., the voltage required is reduced with increased temperature. Because of the magnifying effect of the voltage divider network (R4, R5, R6) a small change of voltage at the base of Q3 corresponds to a larger change in voltage at the battery terminal. A coefficient which has been found to be suitable in practice is about −6 millivolts per degree centigrade rise in temperature per cell. Thus, if the ambient temperature is relatively high, the charger will desirably charge the battery to a lower voltage than if normal temperatures were encountered. Likewise, if the ambient temperature is low, the battery will be charged to a higher voltage than at normal temperatures. This feature is advantageous since it is typical that electrochemical cells require the just stated charge/temperature relationship.

Another desirable feature of the charger is start-up in the high rate. This is achieved because the voltage applied to R3 will first turn on Q2 before the voltage divider network has had sufficient applied voltage to turn on Q3. Furthermore, the charger output is short circuit protected by the voltage at the base of Q2 being insufficient to turn Q2 on when the output is shorted.

As an illustrative example of the invention using the circuitry of FIG. 2 to charge a 6-volt battery of three 2 volt 5 ampere hour sealed lead-acid cells, the following components were used in FIG. 2:

D1, D2, D3, D4, D7, D8, D10 — 1N4001
D5, D6, D9 — 1N914
C1 — 150 microfarads
Q1 — GE D41D1
Q2, Q3 — 2N3567
C2 — 0.005 microfarads
R1 — 1.8 ohms
R2 — 180 ohms
R3 — 22K ohms
R4 — 820 ohms
R5 — 100 ohms
R6 — 120 ohms
R7 — 15 ohms
T1 — 10 volts In this particular illustration, the low voltage cut-in value is 6.65 volts, the high voltage cut-off value 7.65 volts, the high charge maximum current rate 400 milliamperes, and the trickle charge rate 50 milliamperes.

Modifications of the Invention

In the modification shown in FIG. 3, principally a single rate charger network is shown. No trickle bypass at a low rate is provided, although biasing resistor R8 and the other components in the circuitry can be so chosen that transistor Q1, when not in its high rate charging mode, can provide a small trickle charge to the battery.

The charger in FIG. 3 will have more sensitivity to changes in the input voltage and an output current limited only by the transformer rating. Otherwise, the operation of the circuit is virtually the same as that described with respect to FIG. 2.

Figure 4:
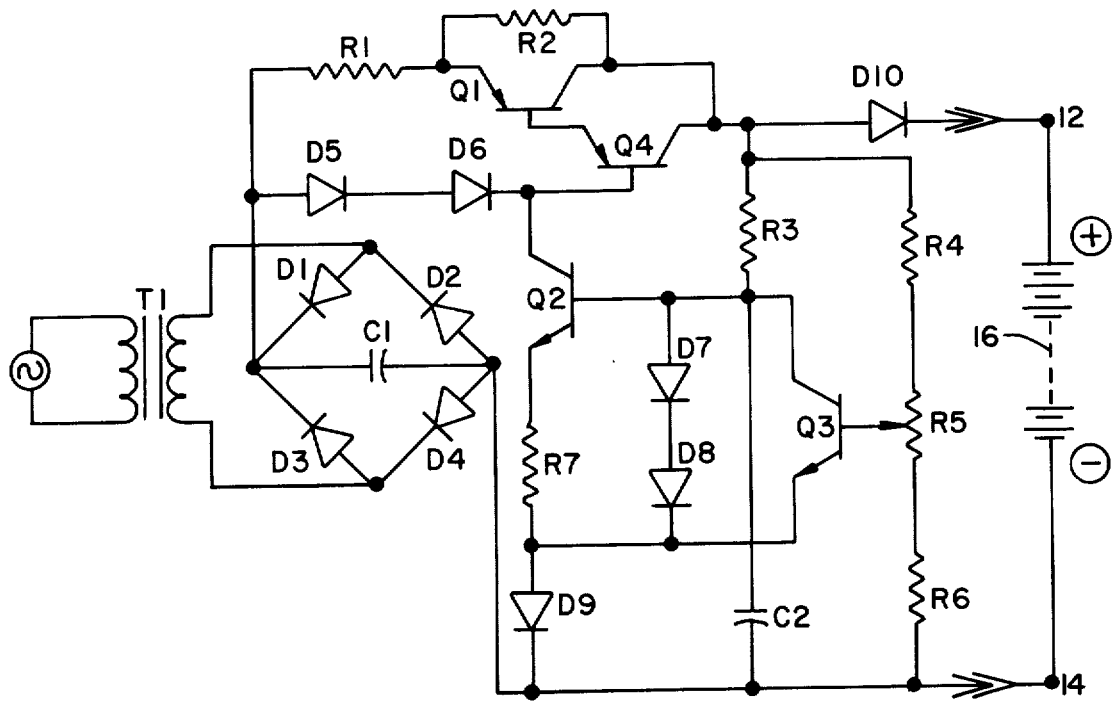

The embodiment shown in FIG. 4 is adapted for use with high power applications, particularly where a large capacity battery is being charged. In this embodiment, an additional transistor Q4 forms a portion of the high series pass element having its emitter connected to the base of Q1 and its collector connected to the collector of Q1 in a Darlington configuration. While a two-stage compound amplifier is shown in FIG. 4, it will be appreciated that for various applications additional stages may be employed.

Figure 5:
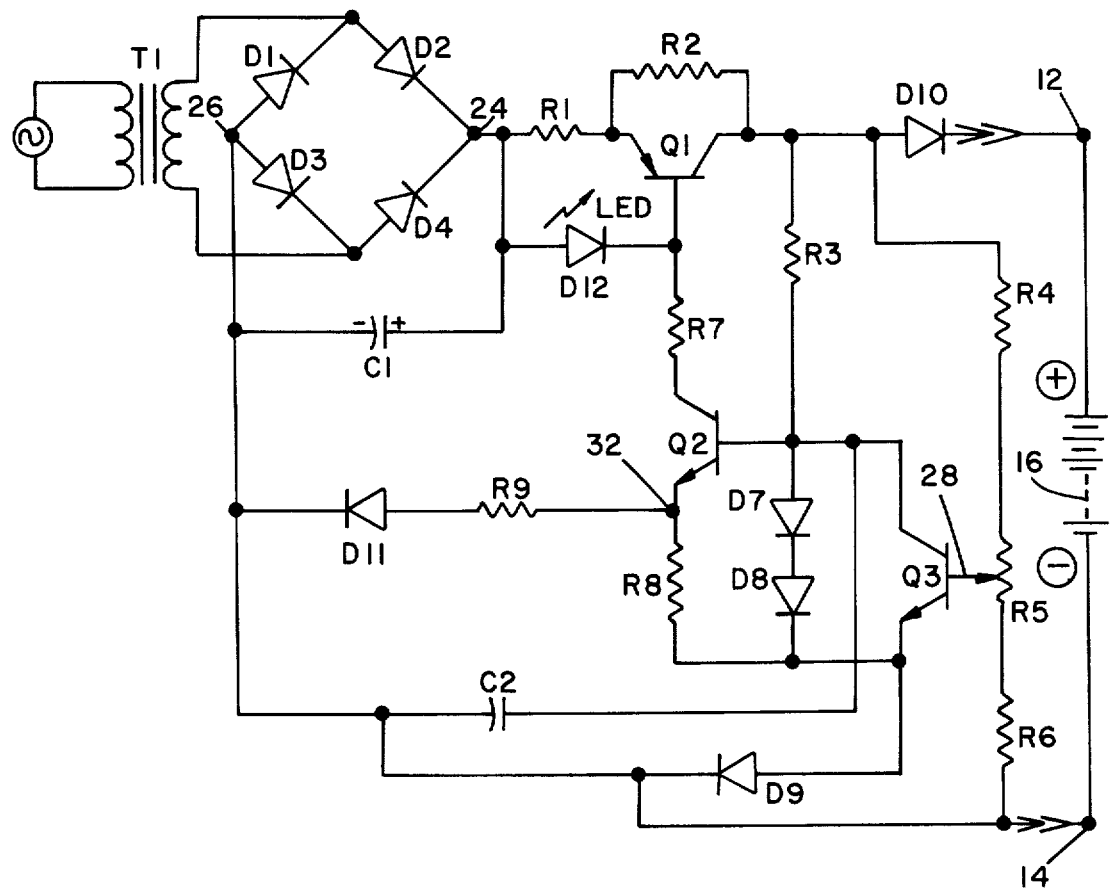

The modification shown in FIG. 5 has application for float charging in which the hysteresis loop has a reduced width. In this respect, a shunt path is provided from junction 32 (between the emitter of Q2 and R8) through a resistor R9 and diode D11 to the negative terminal 14 of the battery. This shunt path reduces the width of the loop by shunting current away from D9 and thereby desensitizing it to fluctuations in voltage exhibited at the tap 28 of R5. As an additional modification, diodes D5 and D6 have been replaced by a single light emitting diode (LED) D12. The light emitting diode will be on when the charger is in its high rate with Q1 conducting thereby acting as an indicator lamp.

It should be understood that the invention is capable of a variety of additional modifications and variations which will be made apparent to those skilled in the art by a reading of this specification. All such modifications are to be included within the sphere and scope of the claims appended hereto.

What is claimed is:

1. A battery charging circuit comprising:
   a source of unidirectional charging current;
   a series pass element having a control terminal, said series pass element characterized by respective conducting and substantially nonconducting states for controlling charging current to the battery;
   means connected across said battery for producing a voltage proportional to the voltage exhibited by the battery;
   a voltage reference element exhibiting a non-linear voltage drop thereacross dependent upon the magnitude of current being conducted by the non-linear element;
   means for comparing said proportional voltage to said voltage reference element and thereby producing a control signal representative of the difference between said proportional voltage and the voltage exhibited by the voltage reference element;
   means responsive to said control signal for rendering said series pass element through its control terminal either in its conducting state or in its substantially non-conducting state;
   means for varying the state of current conduction in the voltage reference element between a relatively high conduction state when the series pass element is in its conducting state and a relatively low conduction state when the series pass element is in its substantially non-conducting state;
   said voltage reference element exhibiting a relatively higher voltage thereacross when said series pass element is in its conducting state and a relatively lower voltage thereacross when said series pass element is in its substantially non-conducting state;
   whereby when said proportional voltage is at or below a first predetermined value the battery charging circuitry initiates delivering high rate charging current to the battery and ceases to deliver high rate charging current to the battery when said proportional voltage reaches or exceeds a second predetermined value which is greater than said first predetermined value.

2. The circuit of claim 1 wherein the series pass element is a transistor whose emitter to collector path is shunted by a low rate series pass element.

3. The circuit of claim 1 wherein said means for producing the proportional voltage includes a voltage divider having a variable tap connected to the base of a first transistor switching means which serves as said means for comparing the proportional voltage to the voltage exhibited by said non-linear element.

4. The circuit of claim 1 wherein the voltage reference element exhibits a negative temperature coefficient.

5. The circuit of claim 3 wherein said responsive means includes a second transistor switching means having its base connected to said first transistor switching means for receiving said control signal, and having its emitter/collector terminals connected in shunt between said control terminal and said non-linear element.

6. The circuit of claim 5 wherein the collector of said first transistor switching means is connected to the base of said second transistor switching means and the emitter of said first transistor switching means is connected to said non-linear element.

7. The circuit of claim 6 wherein resistance means is connected between one side of the series pass element and the junction formed between the base of said second transistor switching means and the collector of said first transistor switching means.

8. The circuit of claim 5 wherein a resistance means is connected between said control terminal and said non-linear element, in series with the emitter/collector path of said second transistor switching means.

9. The circuit of claim 1 wherein a current limiting resistance means is connected in series with said series pass element, and diode means are connected across the current limiting resistance means to the control terminal of the series pass element to form a substantially constant current source when the charger is in its high rate charging mode.

10. The circuit of claim 8 wherein diode means are connected between the base of said second transistor switching means and across said resistance means to form a substantially constant current shunt when said series pass element is in its conducting state.

11. The circuit of claim 1 wherein said non-linear element is a unidirectional diode means.

12. A circuit having first and second output charging terminals for delivering unidirectional current to a battery connected across the terminals comprising:
    a source of unidirectional current;
    a high rate charging path connected between the current source and the first output terminal of the battery and including a series pass element having a control terminal, said series pass element switchable between a conducting mode and a substantially non-conducting mode;

a voltage reference element exhibiting a non-linear voltage drop thereacross dependent upon the magnitude of current being conducted by the non-linear element;

said control terminal connected through a first shunt path to the second output terminal through said voltage reference element;

a second shunt path connected from the high rate charging path through said voltage reference element to the second output terminal;

means for voltage sensing the state of charge of the battery;

control circuitry including a first conducting path connected from said high rate charging path to said first shunt path which is in a state of conductivity when said series pass element is in its conduction mode, and a second conducting path connected from said sensing means to said second shunt path which is in a state of conductivity when said series pass element is in its substantially non-conduction mode;

means for varying the state of current conduction in the voltage reference element between a relatively high conduction state through said first shunt path when the series pass element is in its conducting mode and a relatively low conduction state through said second shunt path when the series pass element is in its substantially non-conducting mode;

said voltage reference element exhibiting a relatively higher voltage thereacross when said series pass element is in its conducting mode and a relatively lower voltage thereacross when said series pass element is in its substantially non-conducting mode.

13. The circuit of claim 12 wherein said first shunt path includes a resistance means in series with the emitter/collector path of first control transistor means.

14. The circuit of claim 12 wherein said second shunt path includes a resistance means in series with the emitter/collector path of a second control transistor means, one side of said resistance means connected to said high rate charging path and the other side connected to said first shunt path along said first conducting path.

15. The circuit of claim 14 wherein said second conducting path is connected from the base of said second control transistor means to a variable tap of a potentiometer connected across the battery and serving as said sensing means.

16. A hysteresis battery charging network comprising:

a source of unidirectional charging current;

a series pass transistor switch characterized by respective conducting and substantially non-conducting states connected between the unidirectional source and one side of a battery to be charged, the base of the series pass transistor serving as a control terminal;

voltage divider means connected across the battery and having a tap;

a first shunt path connected between the base of the series pass transistor and the other side of the battery through a first resistance means, the emitter/collector path of a first control transistor and a voltage reference element which exhibits a non-linear voltage drop thereacross dependent upon its relative state of current conduction; and a second shunt path connected between one side of said series pass transistor and the other side of said battery through a second resistance means, the emitter/collector path of a second control transistor and said voltage reference element, the base of said second control transistor connected to said tap, and the base of said first control transistor connected to the juncture formed between said second resistance means and the collector of said second control transistor;

said voltage reference element exhibiting a relatively higher voltage thereacross when said series pass transistor is in its conducting state and a relatively lower voltage thereacross when said series pass transistor is in its substantially non-conducting state.

17. The network of claim 16 wherein the series pass transistor is shunted by resistive means providing a trickle or float charge bypass to the battery.

18. The network of claim 16 wherein said non-linear element has shunted thereacross resistive means for reducing the difference between the relatively higher voltage and the relatively lower voltage exhibited by the non-linear element.

19. The network of claim 16 wherein said second resistance means has a substantially higher ohmic value than said first resistance means.

20. The network of claim 16 wherein said non-linear element is a diode.

21. The network of claim 16 wherein the voltage reference element exhibits a negative temperature coefficient.

22. The network of claim 16 wherein said voltage divider means has a variable tap.

* * * * *